Figure 1:
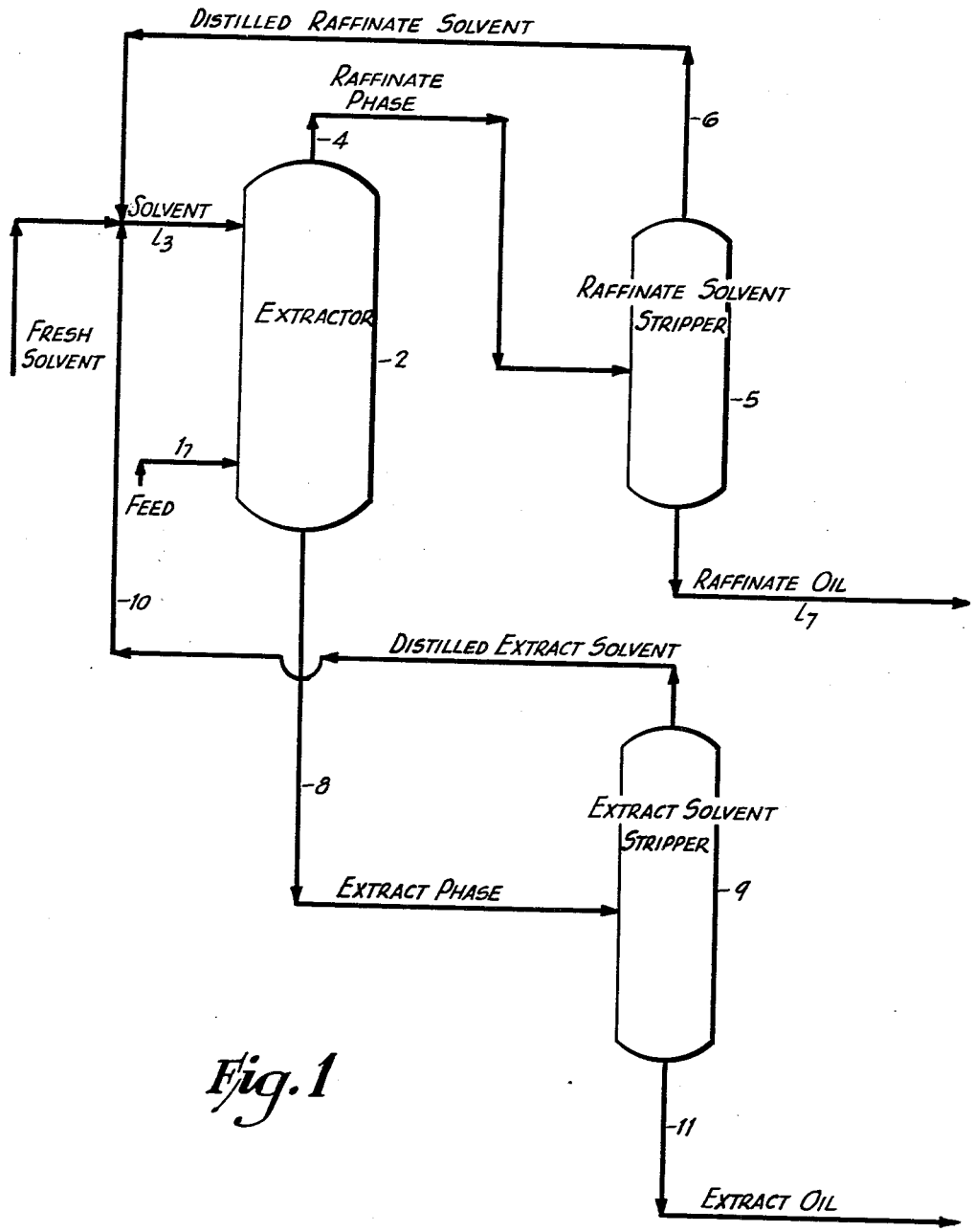

United States Patent Office 2,754,249
Patented July 10, 1956

2,754,249

SOLVENT TREATMENT OF HYDROCARBON MIXTURES

Harold C. Myers and Richard N. Lovett, Woodbury, N. J., assignors to Socony Mobil Oil Company, Inc., a corporation of New York Application June 29, 1953, Serial No. 364,883

2 Claims. (Cl. 196—14.15)

The present invention relates to the solvent treating of mixtures of paraffinic hydrocarbons and non-paraffinic hydrocarbons, and, more particularly, to the solvent treating of mineral oils particularly lubricating fractions thereof to extract non-paraffinic hydrocarbons therefrom.

It is well known in the art to treat mineral oils, particularly petroleum oils with various selective solvents which have the ability to segregate the relatively more aromatic or hydrogen-poor fractions from the relatively more paraffinic or hydrogen-rich fractions. In processes of this character, the oil and selective solvent are suitably contacted by various processes, as for example, by a single batch or by a multi-batch process. In general, the preferred operation is a countercurrent tower treating process in which the lighter phase, usually the oil, is introduced into the center or the bottom section of a countercurrent treating tower. The oil flows upwardly through the tower and contacts down flowing solvent which is introduced into the upper section of the tower. Efficient contact between the countercurrently flowing phases is secured by suitable means, as for example, by contact masses, distributing plates, pierced plates and the like.

The conditions of operation are optimally adjusted to secure desirable results and depend upon various factors, as for example, upon the particular solvent or solvent mixture being used, the oil being treated, and the yield and quality of the products desired. These processes are currently employed in the solvent treatment of petroleum oils in order to improve their quality and in order to segregate particularly desirable fractions. In treating these oils, solvents of the class which have a preferential selectivity for the more aromatic type compounds as compared to the more paraffinic type compounds are usually employed. Solvents of this class are, for example, phenol, furfural, sulfur dioxide, cresol, nitrobenzene, aniline, beta beta dichlor diethyl ether, and the like. Mixtures of these solvents are also utilized, as well as substances of the class of liquefied normally gaseous hydrocarbons.

In commercial installations although the throughput capacity of the extraction tower can be increased moderately by changing the tower packing, the capacity of the solvent stripper for the extract phase often limits the capacity of the entire extraction unit. It is general practice to strip the solvent from the raffinate and the extract phases into two separate solvent recovery systems. These solvent recovery systems each, generally, consist of a flashing tower in which the bulk of the solvent is removed from the hydrocarbons and a stripping tower in which the remainder of the solvent is removed by steam distillation of the oil. The equipment requirements of the solvent recovery systems represent a major portion of the capital costs. Since the extract phase stripping facilities are required to recover approximately 85 per cent of the solvent employed in the process, this equipment becomes the single item of greatest cost. Consequently, any increase in the capacity of the unit would require that the solvent recovery system for recovery of solvent from the extract phase be increased with an increased cost of this major item of capital cost.

Figure 2:
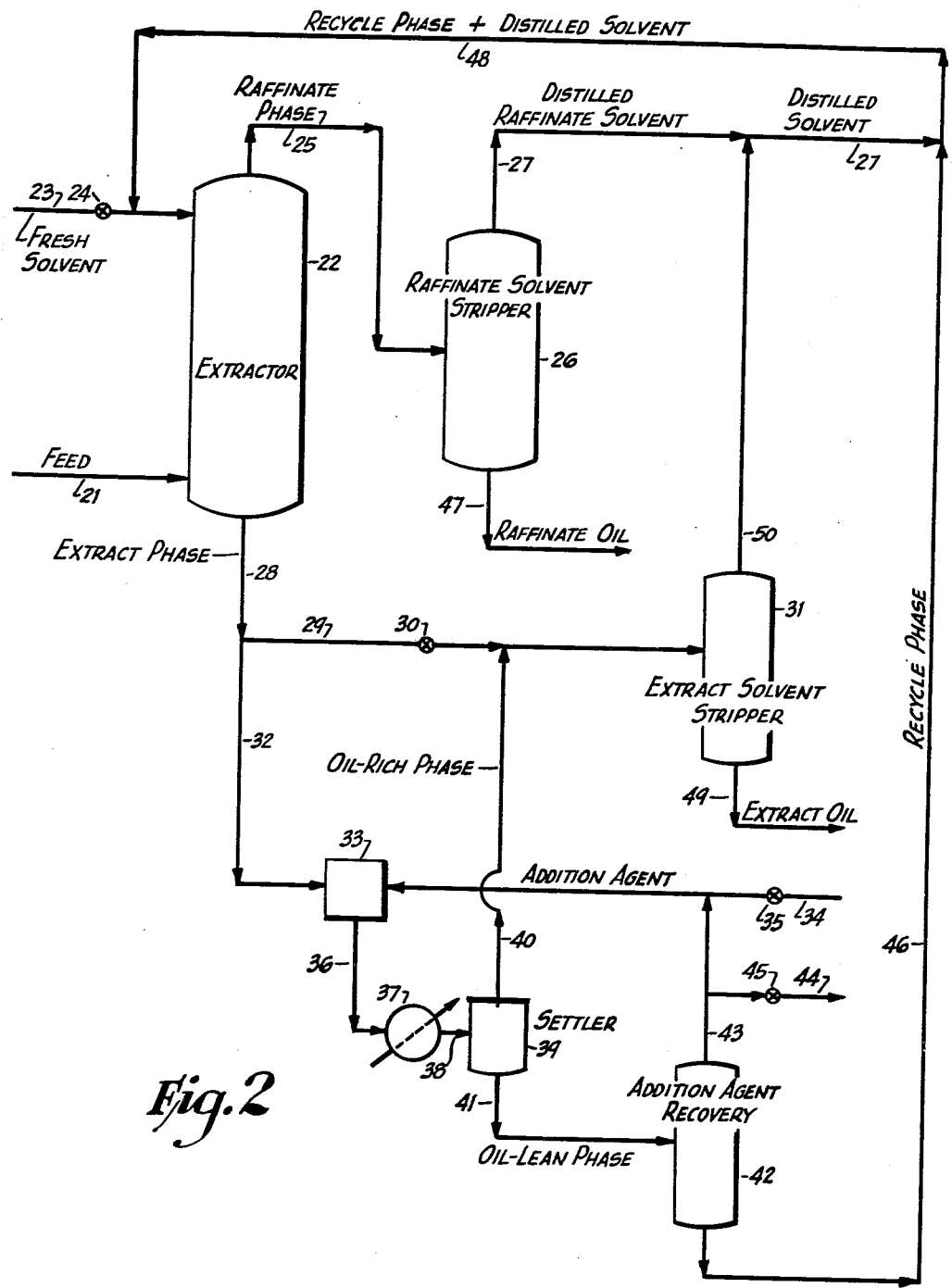
Figure 3:
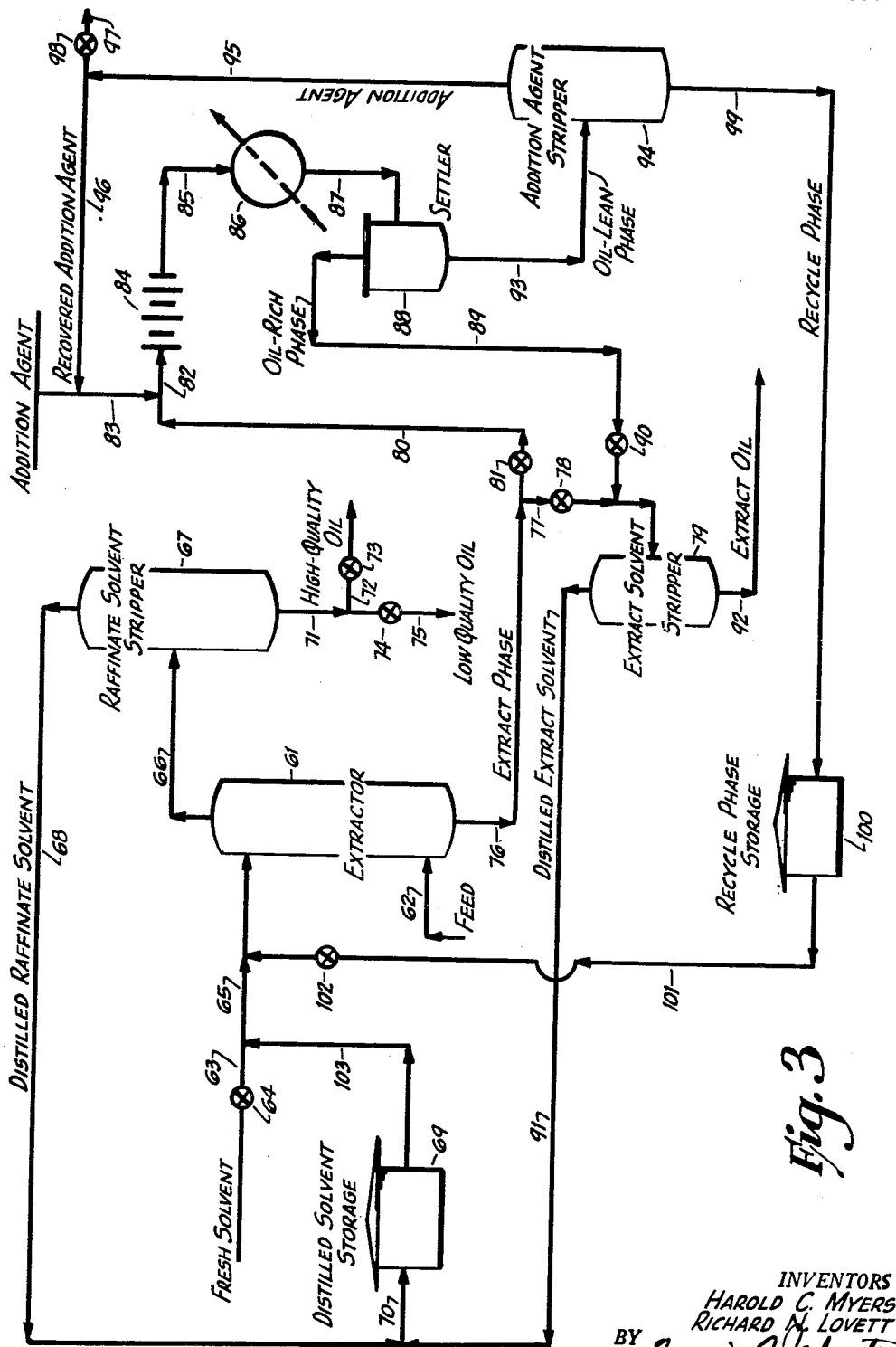
Figure 4:
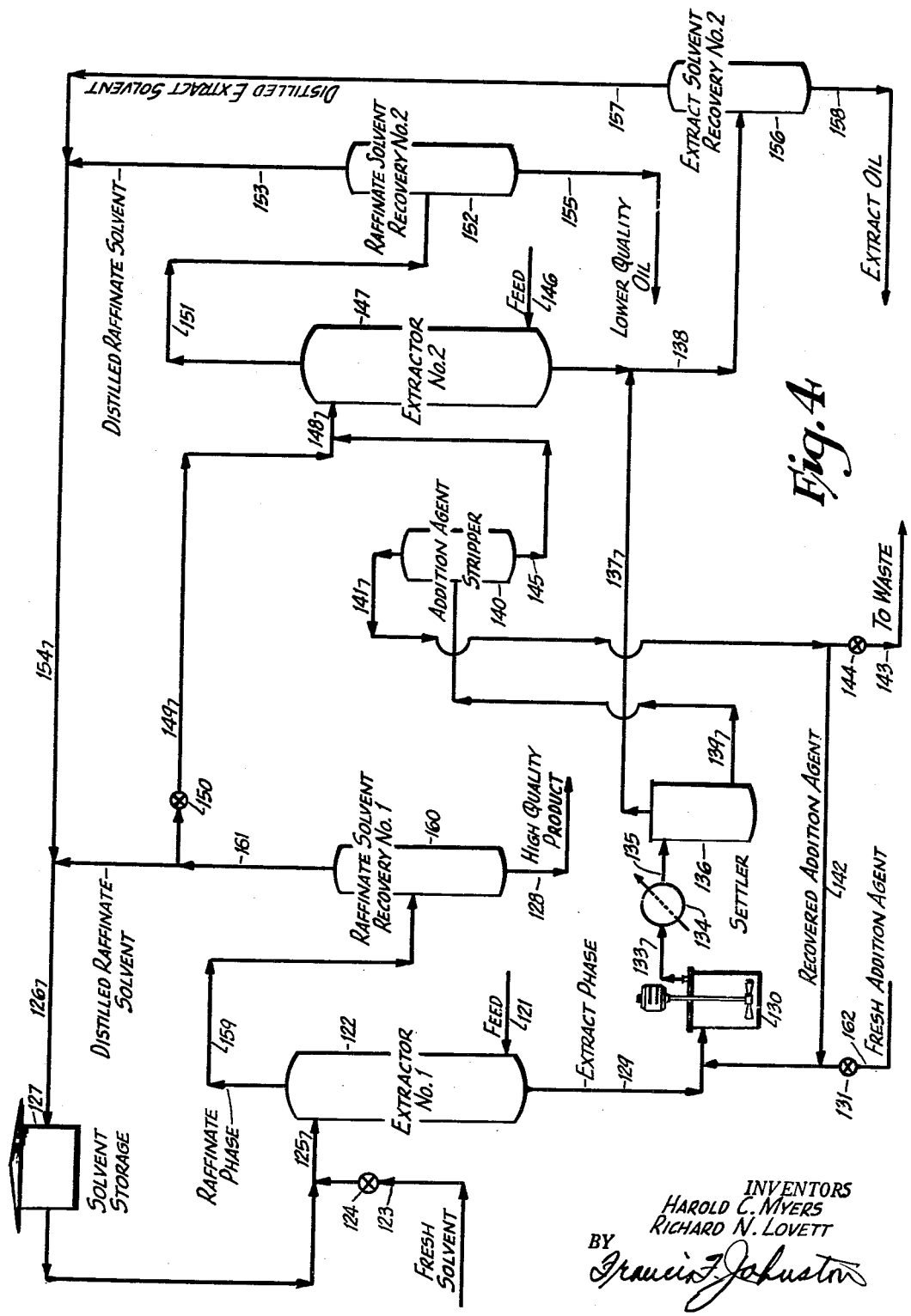

It has now been discovered that the capacity of a solvent treating unit can be increased without increasing the capacity of the solvent recovery system for the recovery of solvent from the extract phase. It is an object of the present invention to provide a method of recovering at least a portion of the solvent from the extracting phase of a solvent refining unit treating a mixture of paraffinic and non-paraffinic hydrocarbons to extract the non-paraffinic hydrocarbons therefrom without substantial increase in the capacity of the solvent recovery facilities for recovering solvent from the extract phase. It is another object of the present invention to provide a method for producing a high grade lubricating oil in one operation and a lower quality lubricating oil in a second operation using solvent recovered from the first operation to extract non-paraffinic hydrocarbons from the oil in the second operation. Other objects and advantages will become apparent from the following discussion taken in conjunction with the figures in which:

Figure 1 is a highly schematic flowsheet representing the extraction of a lubricating oil fraction with an immiscible solvent and recovery of the solvent from both the raffinate phase and the extracting phase by distillation in the conventional manner;

Figure 2 is a highly schematic flowsheet representing the separation of non-paraffinic hydrocarbons from a petroleum lubricating oil fraction, wherein the solvent is removed from the raffinate phase by distillation and the solvent from at least a portion of the extract phase is separated from the extracted non-paraffinic hydrocarbons by addition to the extract phase of a solvent-soluble addition material capable of reducing the solubility of the extracted hydrocarbons in the solvent sufficiently that the separated solvent containing said addition material is substantially devoid of said extracted materials, removing said addition material from solvent, and recycling said solvent recovered from the extracted phase together with solvent distilled from the balance of the extracting phase and solvent distilled from the raffinate phase to extract non-paraffinic hydrocarbons from a petroleum lubricating fraction;

Figure 3 is a highly schematic flowsheet of a "blocked-out" operation in which a petroleum lubricating fraction is treated with solvent to produce a high quality lubricating oil and in a second operation a lower quality lubricating oil is produced by treating the mineral oil fraction with solvent recovered from the extracting phase of the first solvent treated to precipitate the extracted non-paraffinic hydrocarbons by adding to the extract phase a solvent-soluble material capable of reducing the solubility of non-paraffinic hydrocarbons in the aforesaid solvent;

Figure 4 is a highly schematic flowsheet illustrating the treatment of a mineral oil lubricating fraction with a solvent to obtain a raffinate and an extract phase, separating the solvent from the raffinate phase in the usual manner by distillation, and separating the solvent from the extract phase by addition to the extract phase of a solvent-soluble material capable of reducing the solubility of the extracted non-paraffinic hydrocarbons in said solvent, separating the extracted hydrocarbons from the mixture of solvent and addition agent, removing the addition agent, employing the so de-oiled solvent from the solvent extract phase of the first extraction to treat a second lubricating oil fraction to obtain a refined lubricating oil fraction of lower quality than the first, recovering solvent from both the raffinate and the extract phase by distillation and combining the solvent from the raffinate phase of the first treatment with the solvent recovered from the raffinate phase and the extract phase in the second treatment and extracting further amounts of lubricating oil fraction to obtain high quality solvent-treated lubricating oil.

In general, in accordance with the principles of the present invention, at least a portion of the extract phase from a solvent treating operation is de-oiled by adding to the extract phase a solvent - soluble addition material capable of reducing the solubility of the extracted hydrocarbons in the solvent, i. e., a solvent soluble anti-solvent for non-paraffinic hydrocarbons. Suitable solvent-soluble addition materials or anti-solvents for non-paraffinic hydrocarbons are: water, glycols, aliphatic alcohols having 1 to 5 carbon atoms in the molecule, ketones having 1 to 5 carbon atoms in the molecule, and the like.

After addition of the solvent-soluble addition material anti-solvent for non-paraffinic hydrocarbons to at least a portion of the extract phase, the mixture is agitated and then allowed to settle, whereupon the extracted non-paraffinic hydrocarbons separated from the mixture of solvent and addition material to form an upper layer, while the solvent and anti-solvent form a lower layer. The two layers are separated and the solvent plus anti-solvent subjected to distillation to recover or drive off the addition material. The solvent substantially devoid of anti-solvent is then mixed with the solvent recovered from the raffinate phase and recycled to the extraction system.

Illustrative of the conventional solvent refining of a lube oil fraction of mineral oil with conventional recovery of the solvent by distillation of both the raffinate and extract phases is the following example of the solvent refining of a propane deasphalted mineral oil lubricating fraction with furfural.

The propane deasphalted mineral oil lubricating fraction was treated in an extraction tower operating with a temperature gradient of 270° F. at the top and 240° F. at the bottom at a volume ratio of 2.59 volumes of redistilled furfural to one volume of oil. The data so-obtained is presented in Table I.

Table I

| | |
|---|---|
| Charge rate, B/SD | 6505 |
| On-stream time, days | 20.5 |
| Raffinate yield, per cent volume | 60.1 |
| Treating conditions: | |
| Furfural, per cent volume | 259 |
| Extractor— | |
| Top temp., ° F | 270 |
| Bottom temp., ° F | 240 |
| Properties: | |
| Charge— | |
| Gravity, A. P. I | 22.9 |
| COC flashpoint, ° F | 450+(PM) |
| SUV at 210° F | 136 |
| CCR | 1.26 |
| Raffinate— | |
| Gravity, A. P. I | 27.0 |
| SUV at 210° F., seconds | 114 |
| VGC | 0.809 |
| Dewaxed oil— | |
| Pour point, ° F | ---- |
| SUV at 100° F., seconds | 1975 |
| SUV at 210° F., seconds | 130 |
| V. I. | 95 |
| Extract— | |
| Gravity, A. P. I | 15.0 |
| S. S. F. at 122° F | 312 |

A sample of the same propane deasphalting raffinate was refined with a blend of fresh furfural and solvent recovered from the extract phase of a previous furfural treatment of a lubricating oil fraction in the ratio of 1:1 by volume. The furfural was recovered from the previous operation by de-oiling the extract phase thereof by the addition of 5 per cent by volume of water, cooling to 100° F., removing the separated oil-rich layer and dehydrating the oil-lean solvent phase. The raffinate was contacted with this 1:1 blend of fresh furfural and furfural recovered from the extract phase by de-oiling as set forth hereinbefore at 260° F. with a 3:1 volume ratio of solvent blend to charge oil. The yield of raffinate in this operation was 60.4 volume per cent, the viscosity index of the refined oil was 96+ and the viscosity of the refined oil at 210° F. was 130". The qualities of the raffinate obtained by the use of conventional recovery of furfural and by the use of furfural recovered as set forth hereinbefore, are compared in Table II.

Table II

| | Refining with conventionally recovered furfural | Refining with furfural recovered by precipitation |
|---|---|---|
| Yield, percent volume | 60.1 | 60.4 |
| Viscosity index | 95 | 96+ |
| Viscosity at 210° F., seconds | 130 | 130 |

Cyclic studies have shown that the properties of the raffinate produced when using a blend of solvent recovered in the conventional manner and solvent recovered from the extract phase in accordance with the principles of the present invention are not degraded. The solvent employed in the cyclic extractions, data for which are presented in Table III, was prepared as follows. The solvent was a blend of furfural recovered from the extraction phase from a previous solvent treatment which had the following characteristics:

| | |
|---|---|
| Gravity, A. P. I | 15.6 |
| Pour point, ° F | 90 |
| Flash point, ° F | 535 |
| Fire point, ° F | 610 |
| K. v. at 210° F. cs | 36.71 |

The solvent was recovered from the extract phase by adding 5 weight per cent water to the extract phase, cooling the mixture to 100° F., separating the upper oil-rich phase from the lean oil-rich phase containing the furfural and added water, and dehydrating the oil-lean lower phase. The dehydrated oil-lean lower phase was blended with fresh furfural in the ratio of 1:1 by volume.

The mineral oil fraction treated was a propane deasphalted raffinate having the following properties:

| | |
|---|---|
| Gravity, A. P. I | 21.0 |
| Pour point, ° F | 115 |
| Flash point, ° F | 555 |
| Fire point, ° F | 620 |
| K. v. at 210° F. cs | 27.78 |

Table III

[Solvent-to-oil ratio 3:1. Extraction temp. 240° F.]

| Cycle No. | 1 | 2 | 3 | 4 | 5 | 6 |
|---|---|---|---|---|---|---|
| Waxy Raffinate: | | | | | | |
| Yield, vol. percent | 63.5 | 72.1 | 72.7 | 72.5 | 73.6 | 72.4 |
| Gravity, ° A. P. I | 26.1 | 25.9 | 25.4 | 25.6 | 25.5 | 25.6 |
| SUV at 210° F., sec | 114 | 114 | 115 | 115 | 116 | 115 |
| Dewaxed Raffinate: | | | | | | |
| Gravity, ° A. P. I | 25.1 | 24.8 | 24.4 | 24.5 | 24.3 | 24.2 |
| SUV at 210° F., sec | 130 | 128 | 132 | 131 | 132 | 136 |
| Viscosity Index | 94 | 92+ | 92 | 92 | 91+ | 92 |
| Pour, ° F | 20 | 20 | 15 | 20 | 20 | 20 |

The foregoing cyclic operation was studied a second time using a furfural solvent prepared as described hereinbefore and a portion of the same mineral oil lubricating fraction. The data thus obtained are presented in Table IV.

Table IV

[Extraction conditions: Solvent-to-oil ratio 3:1. Temperature 260° F.]

| Cycle No | 1 | 2 | 3 | 4 | 5 |
|---|---|---|---|---|---|
| Waxy Raffinate: | | | | | |
| Yield, Vol. percent | 59.0 | 59.0 | 58.2 | 60.7 | 64.9 |
| Gravity, A. P. I. | 27.1 | 27.2 | 26.8 | 26.9 | 26.5 |
| SUV at 210° F., sec | 114 | 114 | 115 | 115 | 115 |
| Dewaxed Raffinate: | | | | | |
| SUV at 210° F., sec | 127 | 128 | 129 | 139 | 130 |
| Viscosity Index | 97 | 97 | 96 | 95+ | 96 |
| Pour, ° F | 20 | 20 | 20 | 20 | 20 |

The data presented hereinbefore clearly establish that deoiling the solvent of an extract phase obtained in the solvent treating of a mineral oil fraction by the addition of a solvent-soluble addition material capable of reducing the solubility of the non-paraffinic hydrocarbons in the solvent provides solvent suitable for use in combination with solvent recovered in the conventional manner by distillation in which the solvent recovered by distillation does not exceed 50 per cent of the total solvent employed.

Illustrative of the means for employing the principles of the present invention are the flow sheets, Figures 2, 3 and 4. However, before describing Figures 2, 3 and 4, reference will be made to Figure 1 which is a highly schematic flowsheet of conventional solvent treating of hydrocarbon mixtures containing paraffinic and non-paraffinic hydrocarbons with a solvent such as furfural in which the non-paraffinic hydrocarbons are selectively soluble. Thus a mixture of paraffinic and non-paraffinic hydrocarbons such as lubricating fraction of mineral oil, for example, a propane deasphalted lubricating fraction of mineral oil, is introduced through line 1 into extractor 2 in the region of the bottom thereof. Fresh solvent is introduced into extractor 2 through line 3. Both feed and solvent have a temperature of about 80 to about 300° F. and preferably from 150 to about 275° F. when employing furfural as the solvent. The solvent flows downwardly through extractor 2 counter-current to the feed flowing upwardly through extractor 2. The contact of the feed with the selective solvent, for example, furfural, in extractor 2 results in the removal of the non-paraffinic hydrocarbons. Consequently, the oil rising through extractor 2 reaches the top thereof as an oil fraction in which the paraffinic hydrocarbons are concentrated. The refined oil, together with some solvent, forms a raffinate phase and leaves extractor 2 through line 4. The raffinate phase flows through line 4 to raffinate solvent stripper 5 where the solvent is flashed off and taken as an overhead through line 6 to return to the extractor through line 3. The raffinate oil of desired quality, for example, 90 to 100 V. I., forms the bottoms in stripper 5 and is withdrawn through line 7.

Returning now to extractor 2; the extract phase comprising principally solvent together with the non-paraffinic hydrocarbons extracted from the feed flows from extractor 2 through line 8 to extract solvent stripper 9. In conventional operation, the solvent of the extract phase is taken as an overhead product through line 10 and the distilled extraction solvent returned to the extractor line 3 in conjunction with the distilled raffinate solvent. The non-paraffinic hydrocarbons present in the extract phase form the bottoms in the extract solvent stripper and are withdrawn through line 11 to storage or other treatment or use. Thus, in conventional solvent treating, the solvent is recovered from the extract phase entirely by distillation. In contrast, in accordance with the principles of the present invention, at least a portion, preferably a major portion of the solvent in the extract phase, is recovered by mixing an addition agent capable of reducing the solubility of the non-paraffinic hydrocarbons of the extract phase in the solvent. Such an addition agent can be water, glycols, lower alcohols and lower ketones. Illustrative of the use of an addition agent to recover at least a portion, and preferably a major portion, of the solvent from the extract phase is illustrated in Figure 2. Thus, feed such as a propane deasphalted lubricating oil fraction of mineral oil is introduced through line 21 into extractor 22 in the region of the bottom thereof. Fresh solvent is introduced into extractor 22 in the region of the top thereof through line 23, under control of valve 24. The solvent flows downwardly counter-current to the upwardly flowing feed. Contact of the feed with the solvent as the feed flows upwardly in extractor 22 results in the extraction of non-paraffinic hydrocarbons and the formation of a raffinate phase comprising a relatively small amount of solvent and a relatively large amount of raffinate having an increased concentration of paraffinic hydrocarbons as compared to the concentration of paraffinic hydrocarbons in the feed. The raffinate phase leaves extractor 22 through line 25 and flows to raffinate solvent stripper 26. In raffinate solvent stripper 26 the solvent of the raffinate phase is taken overhead as a distilled raffinate solvent through line 27. The raffinate oil having a higher concentration of paraffinic hydrocarbons than the feed and having the required properties such as a V. I. of 90 to 100 forms the bottoms of raffinate solvent stripper 26 and is removed therefrom through line 47 to storage and/or further treatment and distribution.

The solvent flowing downwardly through extractor 22 extracts non-paraffinic hydrocarbons from the feed and forms the extract phase at the bottom of extractor 22. The extract phase leaves extractor 22 through line 28. A portion of the extract phase, preferably a minor portion, is diverted through line 29 under control of valve 30 to extract solvent stripper 31. The balance, preferably the major portion, flows through line 32 to mixer 33 wherein it is mixed with a small proportion, say about 1 to about 6 volume per cent of an addition agent capable of reducing the solubility of the non-paraffinic hydrocarbons of the extract phase in the solvent of the extract phase. As emphasized hereinbefore, suitable addition agents are, water, glycols, lower aliphatic alcohols and ketones. At present, it is preferred to use water as the addition agent. Accordingly, water is introduced into mixer 33 through line 34 under control of valve 35. The mixture of addition agent and extract phase flows from mixer 33 through line 36 to cooler 37 where the temperature is reduced to that at which the solubility of the non-paraffinic hydrocarbons in the mixture of solvent and addition agent is reduced to a practical minimum. From cooler 37 the cooled mixture of non-paraffinic hydrocarbons, solvent and addition agent flows through line 38 to settler 39. In settler 39 an oil-rich phase carrying a small amount of solvent forms the upper layer and is withdrawn from settler 39 through line 40 to extract solvent stripper 31. An oil-lean phase containing the major portion of the solvent from the extract phase, together with the addition agent, forms the lower layer in settler 39 and is withdrawn therefrom through line 41. The oil-lean phase flows through line 41 to the addition agent recovery system. The addition agent recovery system generally is a stripper in which the addition agent can be taken as one fraction and a recycle phase as another. Thus, when water is used as the solvent-soluble addition agent in conjunction with furfural, the water is taken as overhead and the recycle phase comprising solvent and residual non-paraffinic hydrocarbons is taken as a bottoms. Accordingly, the oil-lean phase is withdrawn from settler 39 through line 41 to addition agent recovery system 42, wherein the water is taken as an overhead through line 43 and returned to line 34 for re-use or discharge to waste through line 44 under control of valve 45. The recycle phase comprising the solvent of the extract phase together with the small amount of non-paraffinic hydrocarbons soluble in the solvent in the presence of the solvent-soluble addition agent, is withdrawn from the addition agent recovery system 42 through line 46.

Returning now to raffinate solvent stripper 26. The distilled raffinate solvent is taken overhead through line 27 and flows to line 46 through which the recycle phase flows to line 48. Similarly, the oil-rich phase from settler 39 taken through line 40 is combined with the extract phase in line 29 and introduced into extract solvent stripper 31. In extract solvent stripper 31 an extract oil forms the bottoms and is withdrawn through line 49 to storage, further treatment, etc., while distilled extract solvent is taken overhead through line 50 to line 27 where it is combined with the distilled raffinate solvent. The combined distilled raffinate solvent and the distilled extract solvent flow through line 27 to line 46 where the distilled raffinate solvent and distilled extract solvent are combined with the recycle phase and flow to line 48 and thence to line 23 to be used to extract further amounts of a mixture of paraffinic and non-paraffinic hydrocarbons.

In industrial operation of solvent treating systems for the preparation of lubricating oil fractions of mineral oil having different properties, it is advantageous to use the same extraction and solvent recovery systems when producing two grades of oil. One method of producing two grades of lubricating oil, for example, in the same extraction and solvent recovery system is the so-called "blocked-out" method. In the "blocked-out" method the extraction and recovery systems are used for a period of time sufficient to provide the quantity of oil of a given quality and then the extraction and solvent recovery systems are employed to treat the same or another oil to produce a lubricating oil fraction of lower quality. The principles of the present invention are readily applied to the "blocked-out" method of producing lubricating oils of different qualities. Thus, as shown in Figure 3, a mixture of paraffinic and non-paraffinic hydrocarbons, for example, a propane deasphalted lubricating oil fraction of mineral oil, is introduced into extractor 61 through line 62. Fresh solvent drawn from a source not shown through line 63 under control of valve 64 flows through line 65 into extractor 61 in the upper region of the tower thereof. The feed introduced through line 62 into extractor 61 in the region of the bottom thereof, flows upwardly counter-current to the fresh solvent introduced into extractor 61 in the region of the top thereof through line 65. The feed rising through extractor 61 contacts the solvent flowing counter-current downwardly through extractor 61 and the concentration of paraffinic hydrocarbons is increased in the upwardly flowing oil. The oil so-refined forms the raffinate phase which exists at the top of extractor 61. The raffinate phase comprising principally refined oil having an increased paraffinic hydrocarbon concentration compared with that in the feed, taken with a small amount of solvent forms the raffinate phase which flows from the extractor 61 through line 66 to raffinate solvent stripper 67. In raffinate solvent stripper 67, the solvent is taken as an overhead through line 68 and transferred to distilled solvent storage 69 through line 70. The refined oil or raffinate having a higher concentration of paraffinic hydrocarbons than the feed, and having the required characteristics of a higher quality oil such as for example a V. I. of 90 to 100, forms the bottoms in raffinate solvent stripper 67 and is withdrawn therefrom through line 71. Since this raffinate is a higher quality oil, it is diverted through line 72 under control of valve 73 with valve 74 in line 75 closed. The higher quality lubricating oil flows through line 72 under control of valve 73 to storage or further treatment and/or distribution.

Returning to extractor 61, the solvent flowing downwardly counter-current to the upwardly flowing oil in extractor 61 extracts non-paraffinic hydrocarbons from the oil and forms an extract phase at the bottom of extractor 61. The extract phase is withdrawn from extractor 61 through line 76. A portion, preferably a minor portion, of the extract phase is diverted through line 77 under control of valve 78 to extract solvent stripper 79. The balance, preferably the major portion, flows through line 80 under control of valve 81 to line 82 where a solvent-soluble addition agent capable of reducing the solubility of the non-paraffinic hydrocarbons in the solvent, i. e., an anti-solvent is introduced through line 83 into the extract phase flowing through line 82. The mixture of addition agent and extract phase are mixed in mixer 84, such as an orifice mixer and flow through line 85 to cooler 86 where the mixture of addition agent and extract phase is cooled to a temperature such that the major portion, preferably substantially all of the non-paraffinic hydrocarbons, are practically insoluble in the mixture of solvent and addition agent. From cooler 86 the mixture of extract phase and addition agent flows through line 87 to settler 88 where an oil-rich phase comprising non-paraffinic hydrocarbons and a small amount of solvent forms an upper layer, and an oil-lean phase comprising principally extract solvent and addition agent forms a lower layer. The oil-rich phase is withdrawn from settler 88 through line 89 under control of valve 90 to line 77 where it is combined with the extract phase diverted from line 76. The combined oil-rich phase and extract phase in line 77 flows to extractor solvent stripper 79, wherein the solvent is taken overhead through line 91 and returned therethrough to line 70 to distilled solvent storage 69. The extract oil from the extract phase and the oil-rich phase form a bottoms in extract solvent stripper 79 and are withdrawn through line 92 to storage.

Returning now to settler 88, the lower layer, i. e., oil-lean phase, is withdrawn from settler 88 through line 93 to addition agent stripper 94 wherein the oil-lean phase is fractionated to obtain an addition agent fraction and a recycle phase fraction. When using an anti-solvent for non-paraffinic hydrocarbons having a boiling point below that of the solvent, the addition agent is taken overhead through line 95 and returned to line 83 through line 96. When desirable or convenient or necessary, the addition agent can be discharged to waste through line 97 under control of valve 98. A recycle phase under these conditions comprising the solvent and the oil-lean phase and the non-paraffinic hydrocarbons soluble in the mixture of solvent and addition agent, each, together with the non-paraffinic hydrocarbons forms the oil-lean phase introduced into stripper 94, is withdrawn from stripper 94 through line 99 to recycle phase storage 100. After the required amount of higher quality oil is obtained by solvent treatment with fresh or distilled solvent, preparation is made to produce a lower quality oil.

As is well known to those skilled in the art, oils of various qualities can be produced from the same feed. Accordingly, in producing the lower quality oil in the second "blocked-out" portion, the same or a different feed can be treated. Therefore, the same or a different feed is introduced into extractor 61 in the region of the bottom thereof through line 62. Recycle phase is withdrawn from recycle phase storage 100 through line 101 under control of valve 102 and mixed with sufficient distilled solvent withdrawn from distilled solvent storage 69 through line 103, or fresh solvent drawn from a source not shown through line 63 under control of valve 64 in line 65 to provide the quantity of solvent necessary to treat the feed to produce the lower quality oil. In general, when using furfural as the fresh solvent to prepare lower grade oils, the recycle phase can be mixed with fresh or distilled solvent in the ratio of at least 1:1 and as much as 9 volumes of recycle phase to 1 volume of fresh or distilled solvent. The mixture of fresh or distilled solvent and recycle phase flows through line 65 into extractor 61 in the region of the top thereof. The mixture of solvent and recycle phase flows downwardly counter-current to the upwardly flowing feed. As the feed flows upwardly through extractor 61, the solvent and recycle phase extract non-paraffinic hydrocarbons from the oil. The oil rising in the extractor is refined to produce a raffinate phase, the oil portion of which has a higher concentration of paraffinic hydrocarbons than the feed. The raffinate phase flows from extractor 61 through line 66 to raffinate solvent stripper 67 wherein distilled solvent is taken overhead through line 68 and returned through line 70 to distilled solvent storage 69. The refined oil of lower quality thus made in the first "blocked-out" portion forms the bottoms in stripper 67 and flows therefrom through lines 71 and 75 under control of valve 74 with valve 72 in line 73 closed, to further treatment, storage and/or distribution.

Returning now to extractor 61. As the solvent flows downwardly through extractor 61 it extracts non-paraffinic hydrocarbons from the feed and forms an extract phase which is withdrawn through line 76. A portion, preferably a minor portion, of the extract phase is diverted through line 77 under control of valve 78 to extract solvent stripper 79. The balance, preferably the major portion, flows from line 76 through line 80 under control of valve 81 to line 82 where it is mixed with a solvent-soluble addition agent capable of reducing the solubility of non-paraffinic hydrocarbons in the solvent introduced through line 83. The mixture of addition agent and extract phase is mixed in a mixer 84 such as an orifice mixer and flows through line 85 to cooler 86 where the temperature of the mixture of addition agent and extract phase is cooled to a temperature at which the major portion, at least of the non-paraffinic hydrocarbons present, is insoluble in the solvent plus addition agent mixture. The material mixture of solvent, addition agent and non-paraffinic hydrocarbons flows from cooler 86 through line 87 to settler 88 wherein an oil-rich phase comprising hydrocarbons precipitate from the solvent and a small amount of solvent forms the upper layer. An oil-lean phase comprising the major portion of the solvent of the extract phase addition agent and a small amount of the non-paraffinic hydrocarbons forms a lower layer. The oil-rich phase upper layer is withdrawn from settler 88 through line 89 under control of valve 90 to line 77 where it is mixed with the extract phase diverted from line 76 and introduced into extract solvent stripper 79. The solvent is taken as an overhead from extract solvent stripper 79 through line 91 and returned to distilled solvent storage 69 through line 70.

The extract oil forms a bottoms in stripper 79 and is withdrawn through line 92 to storage, further treatment, distribution, etc. The oil-lean phase lower layer in settler 88 is withdrawn through line 93 to stripper 94 wherein the addition agent is taken as one fraction and the recycle phase as a second fraction. The water which has a lower boiling point than the furfural is used as the addition agent. The water is taken overhead through line 95 and returned to line 83 through line 96. When desirable or necessary or convenient, the addition agent can be discharged to waste through line 97 under control of valve 98.

The recycle phase comprising the solvent from the extract phase which formed the major portion of the oil-lean phase in settler 88 together with the soluble non-paraffinic hydrocarbons forms a bottoms in stripper 94. These bottoms are withdrawn through line 99 to recycle phase storage 100 for further use in the treatment of mixtures of paraffinic and non-paraffinic hydrocarbons.

Figure 4 is illustrative of a method employing the principles of the present invention to produce from one extractor a high quality oil and from a second extractor a low quality oil from the same or different feed stocks employing the recycle phase of the extraction phase of the first extraction with or without distilled raffinate solvent in the second extraction stage. Thus, a mixture of hydrocarbons comprising paraffinic and non-paraffinic hydrocarbons is drawn from a source not shown through line 121 and introduced into extractor 122 in the region of the bottom thereof. Fresh solvent drawn from a source not shown through line 123 under control of valve 124 is introduced through line 125 into extractor 122 in the region of the top thereof. The feed stock flows upwardly counter-current to the downwardly flowing solvent. In its passage upward through extractor 122 the feed stock is stripped of non-paraffinic hydrocarbons thereby increasing the concentration of paraffinic hydrocarbons in the refined oil. The refined oil with a small amount of entrained solvent forms a raffinate phase which flows from extractor 122 through line 159 to raffinate solvent recovery system 160. The distilled raffinate solvent is taken overhead through line 161 to line 126 and transferred to solvent storage 127. The refined oil of the raffinate phase forms the bottoms of the raffinate solvent recovery system fractionating tower and is withdrawn therefrom through line 128 to further treatment and/or storage and/or distribution. The refined oil withdrawn as bottoms through 128 from raffinate solvent stripper 160 is of higher quality, for example, having a V. I. of about 95 to about 100.

Returning now to extractor 122, the solvent flowing downwardly through extractor 122 extracts non-paraffinic hydrocarbons from the feed stock to form an extract phase which is withdrawn from extractor 122 through line 129. The extract phase flows through line 129 to mixer 130 which can be of any suitable type, for example, a turbo-mixer. Fresh addition agent is introduced into the extract phase in line 129 by drawing fresh addition agent from a source not shown through line 162 under control of valve 131, or recovered addition agent or a mixture of recovered addition agent and fresh addition agent. The addition agent together with the extract phase are thoroughly mixed in mixer 130 and the mixture discharged through line 133 to cooler 134. The addition agent is a solvent-soluble material capable of reducing the solubility of the non-paraffinic hydrocarbons in the solvent. The mixture of extract phase and addition agent is cooled in cooler 134 to a temperature such that the major portion of the non-paraffinic hydrocarbons is insoluble in the mixture of solvent and addition agent. The cool mixture of extract phase and addition agent flows through line 135 to settler 136, wherein an oil-rich phase comprising non-paraffinic hydrocarbons and a small amount of solvent forms an upper layer and an oil-lean phase comprising solvent, addition agent and a small amount of hydrocarbon forms a lower layer. The oil-rich upper layer flows from line 137 to line 138 where it is mixed with the extract phase from the second extraction. The oil-lean lower layer flows through line 139 to addition agent recovery system 140 wherein the oil-lean phase is fractionated into an addition agent fraction and a recycle phase comprising solvent and hydrocarbon dissolved therein forming a second fraction. When the addition agent has a boiling point lower than that of the solvent, the addition agent is taken as an overhead through line 141 and returned to line 162 through line 142. When desirable or necessary or convenient, all or part of the recovered addition agent can be diverted to waste through line 143 under control of valve 144.

When the addition agent has a boiling point below that of the solvent, the solvent and the hydrocarbons dissolved therein forming the oil-lean lower layer in settler 136 form the bottoms in fractionating tower 140 which is withdrawn through line 145. A second feed which may be the same charge stock as the feed to extractor 122, or which may be a different charge stock, is introduced through line 146 into extractor 147 in the region of the bottom thereof. Extract phase from fractionator 140 flows through line 145 and is introduced into extractor 147 through line 148 in the region of the top of the extractor. When desirable or necessary, distilled raffinate solvent can be diverted from line 161 through line 149 under control of valve 150 and mixed with recycle phase flowing through line 145 into line 148.

The extract phase introduced into extractor 147 in the region of the top thereof flows downwardly counter-current to the feed flowing upwardly in extractor 147. The feed stock flowing upwardly through extractor 147 is stripped of non-paraffinic hydrocarbons providing a refined charge stock having a higher concentration of paraffinic hydrocarbons than the concentration in the feed stock. The refined oil together with a small amount of solvent forms a raffinate phase which flows from extractor 147 through line 151 to raffinate solvent recovery system 152. In this raffinate solvent recovery system, the raffinate phase is fractionated into a distilled raffinate solvent fraction which is taken overhead through line 153 and flows through lines 154 and 126 to solvent storage 127. The bottoms of the fractionator of the raffinate solvent recovery system 152 is the raffinate oil. The raffinate oil is withdrawn from the fractionator 152 through line 155 for further treatment and/or storage and/or distribution. This raffinate oil is of lower quality than the raffinate oil withdrawn from fractionator 160 through line 128, and generally, will have for lubricating oil fractions a V. I. of about 85 to about 95.

Returning now to extractor 147. The recycle phase alone or in conjunction with distilled raffinate solvent is introduced into the upper part of extractor 147 through line 148 and flows downwardly therethrough extracting non-paraffinic hydrocarbons from the feed stock introduced into extractor 147 through line 146. The recycle phase or recycle phase and distilled raffinate solvent together with the extracted non-paraffinic hydrocarbons forms an extract phase. The extract phase is withdrawn from extractor 147 through line 138 and in conjunction with the oil-rich upper layer in settler 136 flowing through line 137 is introduced into extract solvent recovery system 156. In extract recovery system 156 the extract phase from extractor 147 and the oil-rich phase from settler 136 are fractionated into an extract solvent fraction and an extract oil fraction. The extract solvent fraction is taken overhead through line 157 to line 154 and thence through line 126 to solvent storage 127. The extracted oil fraction forms a bottoms in the fractionator 156 and is withdrawn therefrom through line 158 to storage and/or further treatment and/or distribution.

Thus, by the use of two extractors it is possible to pass the recycle phase comprising the solvent separated from the extract oil by the addition of the addition agent in series to a second extractor and use the recycle phase from the extract phase of the first extractor to extract non-paraffinic hydrocarbons from a second charge stock to provide a lower quality oil than is obtained from the first extractor. However, it will be noted that the solvent recovery system for the recovery of solvent from the extract phase of both the first extraction and the second extraction is of substantially the same capacity as the solvent recovery system required to recover the solvent from the extract phase of the first extraction operation when operating in accordance with conventional principles.

Those skilled in the art will recognize that the descriptions of the methods illustrated by the highly schematic flowsheets, Figures 2, 3 and 4, are illustrative of the application of the principles of the present invention in the use of a recycle phase alone or in conjunction with fresh or distilled solvent to extract non-paraffinic hydrocarbons from a mixture of paraffinic and non-paraffinic hydrocarbons whereby the capacity of a unit can be increased without increasing the capacity of the recovery system for the recovery of solvent from the extract phase. Or, in cases where new units are being built, recycle of the low oil content extract phase will permit construction of smaller extract recovery facilities.

We claim:
1. In the method of separating non-paraffinic hydrocarbons from paraffinic hydrocarbons wherein a mixture of paraffinic and non-paraffinic hydrocarbons is contacted with a solvent having a greater solubility for non-paraffinic than for paraffinic hydrocarbons, to form a raffinate phase richer in paraffinic hydrocarbons than the aforesaid mixture of paraffinic and non-paraffinic hydrocarbons and containing solvent and to form an extract phase comprising a major portion of the solvent together with non-paraffinic hydrocarbons extracted from the aforesaid mixture, fractionating the aforesaid raffinate phase to obtain a solvent fraction and a raffinate oil fraction and returning the aforesaid solvent fraction to the extractor, fractionating the extract phase to obtain a solvent fraction and an extract oil fraction and returning the extract solvent fraction to the extractor wherein in combination with the raffinate solvent fraction said extract solvent fraction is used to extract further mixtures of paraffinic and non-paraffinic hydrocarbons, the improvement which comprises dividing said extract phase into two portions adding to one portion of said extract phase a solvent-soluble addition agent capable of reducing the solubility of non-paraffinic hydrocarbons in said solvent, cooling said portion of extract phase to a temperature at which a major portion of the non-paraffinic hydrocarbons contained therein is substantially insoluble in said mixture of solvent and addition agent, separating said non-paraffinic hydrocarbons from said mixture of solvent and addition agent by gravity to obtain an oil-rich upper layer and an oil-lean lower layer, separating said oil-rich upper layer from the said oil-lean lower layer, combining said oil-rich upper layer with the other portion of said extract phase and fractionating said mixture of oil-rich upper layer and said other portion of said extract phase to obtain a solvent fraction and a bottoms comprising extract oil, and combining said solvent fraction recovered from said extract phase and said oil-rich phase with the solvent fraction recovered from the aforesaid raffinate phase, fractionating said oil-lean lower layer to obtain a fraction comprising substantially only addition agent and a recycle phase fraction comprising solvent and non-paraffinic hydrocarbons, and extracting further amounts of a mixture of paraffinic and non-paraffinic hydrocarbons with said recycle phase.

2. The improvement in the solvent treating of mixtures of paraffinic and non-paraffinic hydrocarbons as set forth in claim 1 wherein the recycle phase is combined with distilled solvent to extract further amounts of mixtures of paraffinic and non-paraffinic hydrocarbons.

References Cited in the file of this patent

UNITED STATES PATENTS

| | | |
|---|---|---|
| 2,091,078 | McKittrick et al. | Aug. 24, 1937 |
| 2,106,234 | Bray | Jan. 25, 1938 |
| 2,107,681 | Van Dijck | Feb. 8, 1938 |
| 2,149,643 | Tijmstra | Mar. 7, 1939 |
| 2,201,549 | Van Dijck | May 21, 1940 |